United States Patent
Nam et al.

(10) Patent No.: US 7,440,055 B2
(45) Date of Patent: Oct. 21, 2008

(54) TRANSFLECTIVE LIQUID CRYSTAL DISPLAY DEVICE AND FABRICATING METHOD THEREOF

(75) Inventors: Mi-Sook Nam, Gunpo-si (KR); Sang-Min Jang, Annyang-si (KR); Su-Seok Choi, Hanami-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 10/809,995

(22) Filed: Mar. 26, 2004

(65) Prior Publication Data
US 2004/0233359 A1    Nov. 25, 2004

(30) Foreign Application Priority Data
May 23, 2003    (KR) .................. 10-2003-0032871

(51) Int. Cl.
*G02F 1/1343*    (2006.01)
(52) U.S. Cl. .................................. 349/114
(58) Field of Classification Search ............... 349/113, 349/114
See application file for complete search history.

(56) References Cited

U.S. PATENT DOCUMENTS

| | | | | |
|---|---|---|---|---|
| 6,795,637 B1 * | 9/2004 | Moon et al. | | 386/46 |
| 6,809,785 B2 * | 10/2004 | Fujino | | 349/114 |
| 6,819,374 B2 * | 11/2004 | Sekiguchi | | 349/106 |
| 6,831,718 B2 * | 12/2004 | Wei et al. | | 349/114 |
| 6,853,421 B2 * | 2/2005 | Sakamoto et al. | | 349/114 |
| 6,879,361 B2 * | 4/2005 | Moon et al. | | 349/114 |
| 6,885,418 B2 * | 4/2005 | Matsushita et al. | | 349/113 |
| 6,927,820 B2 * | 8/2005 | Jang et al. | | 349/114 |
| 2003/0128329 A1 | 7/2003 | Kim | | |
| 2005/0213005 A1* | 9/2005 | Murai et al. | | 349/114 |

FOREIGN PATENT DOCUMENTS

| KR | 2001-00724902 | 7/2001 |
|---|---|---|
| KR | 10 20040070716 A | 8/2004 |

OTHER PUBLICATIONS

Korean Office Action for corresponding Korean application No. 10-2003 0032871.

* cited by examiner

*Primary Examiner*—James A Dudek
(74) *Attorney, Agent, or Firm*—Brinks Hofer Gilson & Lione

(57) ABSTRACT

A transflective liquid crystal display device includes a pixel region having reflective and transmissive portions. A first passivation layer having one or more protrusions in the reflective portion is disposed on a thin film transistor formed on a first substrate. A reflective layer disposed on the first passivation layer in the reflective portion is uneven, at least in part due to the protrusions. A second passivation layer and a pixel electrode are disposed on the first passivation layer. A color filter layer disposed on an inner surface of the second substrate has at least one through hole in the reflective portion. An overcoat layer disposed on the color filter layer has an open portion in the transmissive portion. A common electrode is disposed on the overcoat layer and a liquid crystal layer is disposed between the pixel electrode and the common electrode.

14 Claims, 12 Drawing Sheets

TRANSFLECTIVE LIQUID CRYSTAL DISPLAY DEVICE AND FABRICATING METHOD THEREOF

The present invention claims the benefit of Korean Patent Application No. 2003-32871, filed in Korea on May 23, 2003, which is hereby incorporated by reference.

BACKGROUND OF THE INVENTION

1. Field of the Invention

The present invention relates to a liquid crystal display device, and more particularly, to a transflective liquid crystal display device and a fabricating method thereof.

2. Discussion of the Related Art

Flat panel display (FPD) devices having portability and low power consumption have been a subject of increasing research in the present information age. Generally, FPD devices may be classified according to their ability for self-emission, and may include emissive display devices and non-emissive display devices. The emissive display devices display images by taking advantage of their ability to self-emit light, and the non-emissive display devices require a light source since they do not emit light by themselves. For example, plasma display panel (PDP) devices, field emission display (FED) devices, and electroluminescent display (ELD) devices are commonly used as emissive display devices. Liquid crystal display (LCD) devices may be categorized as non-emissive display devices and are commonly used in notebook and desktop computers because of their high resolution, capability of displaying colored images, and high quality image display.

In general, an LCD device includes two substrates disposed such that respective electrodes of the two substrates face into each other. A liquid crystal layer is interposed between the respective electrodes. When a voltage is applied to the electrodes, an electric field is generated and the electric field modulates the light transmittance of the liquid crystal layer by reorienting liquid crystal molecules, thereby displaying images in the LCD device.

Since the LCD device is a non-emissive-type display device, an additional light source is required. Thus, a backlight unit is disposed under an LCD panel, wherein the LCD device displays images using light produced by the backlight unit. The respective electrodes of the two substrates of the LCD device may be formed of a transparent conductive material and the two substrates of an LCD device may be formed of a transparent material. The above-mentioned LCD device is referred to as a transmissive type LCD device. Even though the transmissive type LCD device displays bright images under dark surroundings due to an artificial light source such as a backlight unit, power consumption of the LCD device increases due to the backlight unit.

In order to improve above disadvantages of the transmissive type LCD device, a reflective type LCD device has been suggested. Since the reflective type LCD device uses the ambient artificial or natural light instead of light from the backlight unit, power consumption of the reflective type LCD device is smaller than that of the transmissive type LCD device. In the reflective LCD device, a reflective layer of a metallic material having a high reflectance is formed on a first substrate and a common electrode of a transparent conductive material is formed on a second substrate. Even though the low power consumption of the reflective type LCD device is improved, the reflective type LCD device may not be used where the ambient light is weak or does not exist due to low brightness.

In order to overcome such problems, a transflective LCD device has been researched and developed. The transflective LCD device can be switched from a transmissive mode using transmission of light to a reflective mode using reflection of light according to the user's selection. Accordingly, disadvantages of the transmissive type LCD device and the reflective type LCD device such as high power consumption and low brightness under dark surroundings are improved.

Figure 1:
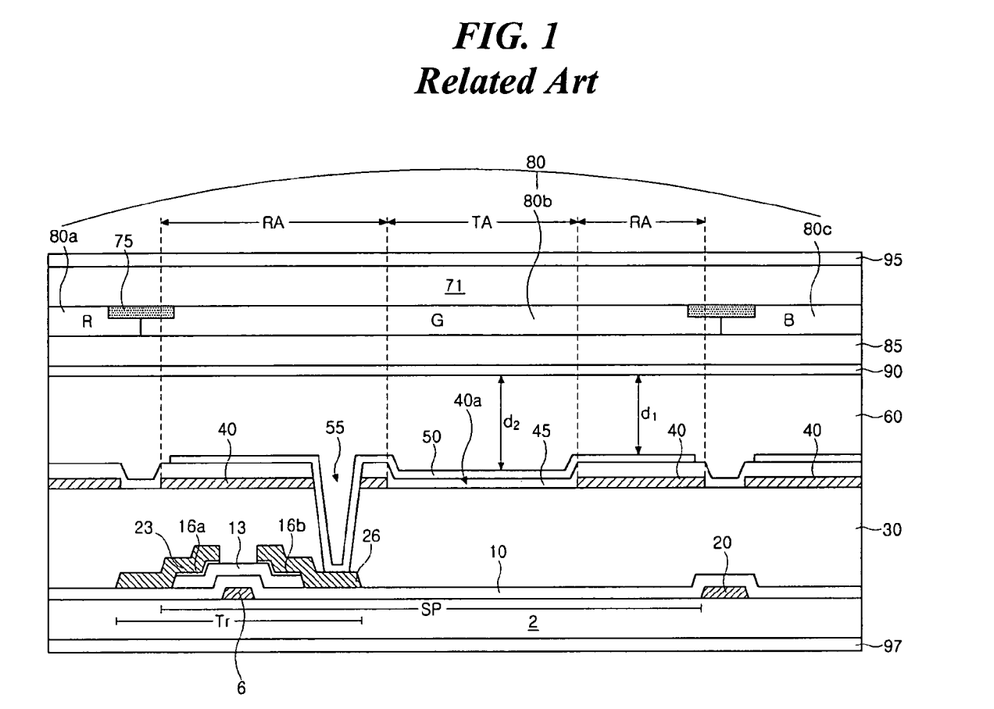
FIG. 1 is a schematic cross-sectional view of a transflective liquid crystal display device having a single cell gap according to the related art.

FIG. 1 is a schematic cross-sectional view of a transflective liquid crystal display device having a single cell gap according to the related art.

In FIG. 1, a gate electrode 6 is formed on a first substrate 2 and a gate insulating layer 10 is formed on the gate electrode 6. Even though not shown in FIG. 1, a gate line connected to the gate electrode 6 is formed under the gate insulating layer 10. An active layer 13 and an ohmic contact layer 16a and 16b are sequentially formed on the gate insulating layer 10 over the gate electrode 6. Source and drain electrodes 23 and 26 are formed on the ohmic contact layer 16a and 16b. The source and drain electrodes 23 and 26 constitute a thin film transistor (TFT) "Tr" with the gate electrode.

A data line 20 of the same material as the source and drain electrodes 23 and 26 is formed on the gate insulating layer 10. Even though not shown in FIG. 1, the data line 20 is connected to the source electrode 23. The data line 20 crosses the gate line (not shown) to define a pixel region "SP." A first passivation layer 30 of an organic material having a low dielectric constant is formed on the TFT "Tr." A reflective layer 40 of a metallic material having a high reflectance is formed on the first passivation layer 30 in a reflective portion "RA." The reflective layer 40 has an open portion 40a corresponding to a transmissive portion "TA." A second passivation layer 45 of an inorganic material is formed on the reflective layer 40. A pixel electrode 50 connected to the drain electrode 26 through a contact hole 55 is formed on the second passivation layer 45 in each pixel region "SP."

A black matrix 75 is formed on a second substrate 71 and a color filter layer 80 including red, green and blue sub-color filters 80a, 80b and 80c is formed on the black matrix 75. An overcoat layer 85 and a common electrode 90 of a transparent conductive material are sequentially formed on the color filter layer 80. One sub-color filter 80a, 80b and 80c corresponds to one pixel electrode 50. The black matrix 75 overlaps edge of the pixel electrode 50 and corresponds to the data line 20.

A liquid crystal layer 60 is formed between the pixel electrode 50 and the common electrode 90. When a voltage is applied to the pixel electrode 50 and the common electrode 90, arrangement state of liquid crystal molecules in the liquid crystal layer 60 changes according to an electric field generated between the pixel electrode 50 and the common electrode 90. Even though not shown in FIG. 1, respective orientation films are formed on the pixel electrode 50 and the common electrode 90 to determine an initial arrangement state of the liquid crystal molecules. Respective retardation films 97 and 95 are formed outsides of the first and second substrates 2 and 71 to adjust phase of light.

In the transflective LCD device of FIG. 1, a first cell gap "$d_1$" of the reflective portion "RA" is similar to a second cell gap "$d_2$" of the transmissive portion "TA." Accordingly, cell efficiency between the reflective portion "RA" and transmissive portion "TA" is not optimized. These cause problems such as reduction of transmittance and brightness. To overcome above problems, a transflective LCD device having a dual cell gap is suggested.

Figure 2:
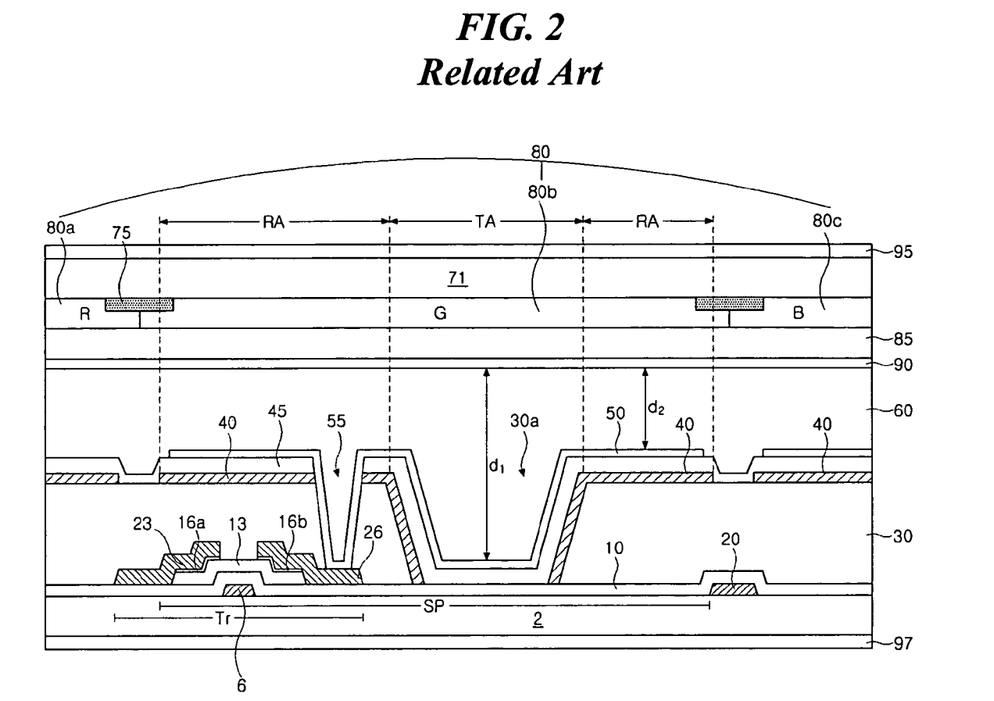
FIG. 2 is a schematic cross-sectional view of a transflective liquid crystal display device having a dual cell gap according to the related art.

FIG. 2 is a schematic cross-sectional view of a transflective liquid crystal display device having a dual cell gap according to the related art. Illustration for the same portions as the transflective LCD device of FIG. 1 will be omitted.

In FIG. 2, a first passivation layer 30 has an open portion 30a corresponding to a transmissive portion "TA." Accordingly, a first cell gap "$d_3$" of the reflective portion "RA" is a half of a second cell gap "$d_4$" of the transmissive portion "TA." A liquid crystal layer 60 includes liquid crystal molecules of an electrically controlled birefringence (ECB) mode. When liquid crystal molecules of an ECB mode are used for an LCD device, transmittance curve of the LCD device has periodic peaks every multiple of a unit cell gap. Accordingly, light efficiency in the reflective portion "RA" is similar to that in the transmissive portion "TA" and cell efficiency of the reflective portion "RA" and the transmissive portion "TA" is maximized.

The reflective LCD devices of FIGS. 1 and 2, however, have problems such that color property is reduced in the transmissive portion. While light passes through the color filter layer twice, i.e., before and after reflection in the reflective portion, light from the backlight unit passes the color filter layer once in the transmissive portion. Accordingly, light emitted from the transmissive portion is different from that from the reflective portion in color property. Moreover, reflection efficiency is not maximized due to flatness of the reflective layer. Recently, to overcome the above problems, a transflective LCD device has been suggested that incorporates a color filter layer with a through hole and an uneven reflective layer.

Figure 3:
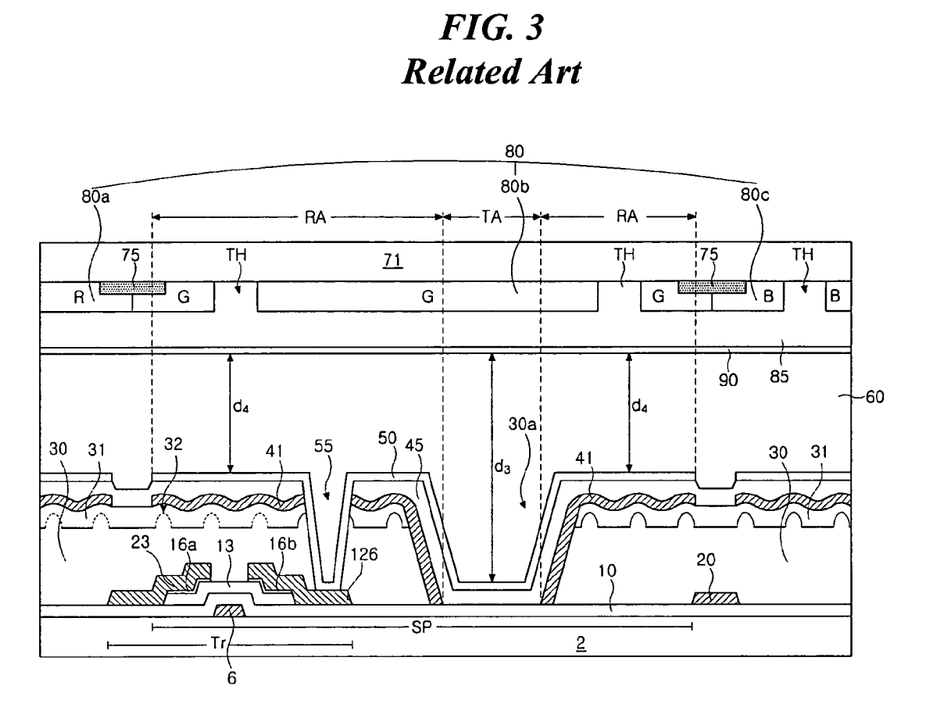
FIG. 3 is a schematic cross-sectional view of a transflective liquid crystal display device having a dual cell gap, a color filter layer including a through hole and a reflective layer having unevenness according to the related art.

FIG. 3 is a schematic cross-sectional view of a transflective liquid crystal display device having a dual cell gap, a color filter layer including a through hole and a reflective layer having unevenness according to the related art. Illustration for the same portions as the transflective LCD devices of FIGS. 1 and 2 will be omitted.

In FIG. 3, a color filter layer 80 including red, green and blue sub-color filters 80a, 80b and 80c has a through hole "TH" to adjust color property and brightness. The through hole "TH" does not include color resin for the color filter layer 80, and color property and brightness may be adjusted by varying number and size of the through hole "TH." Since the through hole "TH" corresponds to a reflective portion "RA," color property and brightness of light emitted from the reflective portion "RA" becomes similar to those of light emitted from a transmissive portion "TA." Moreover, since a reflective layer 41 includes unevenness, reflection efficiency is improved.

First and second passivation layers 30 and 31 are sequentially formed on a thin film transistor (TFT) "Tr." The first passivation layer 30 has a protrusion 32 for unevenness of the reflective layer 41 and an open portion 30a for a dual cell gap such that a first cell gap "$d_3$" in the transmissive portion "TA" is a double of a second cell gap "$d_4$" in the reflective portion "RA." The protrusion 32 and the open portion 30a may be formed through one etching process. However, it is hard to obtain an optimum process condition for the protrusion 32 and the open portion 30a simultaneously. Moreover, the optimum process condition for the protrusion 32 and the open portion 30a may be changed according to the number and the size of the through hole "TH" of the color filter layer 80. Accordingly, design and fabricating process for the transflective LCD device are not stable, and inferiority may occur during the fabricating process.

SUMMARY OF THE INVENTION

Accordingly, the present invention provides a liquid crystal display device that substantially obviates one or more of the problems due to limitations and disadvantages of the related art.

This is to say that the present invention provides a transflective liquid crystal display device having high reflection efficiency, high color efficiency and high brightness, and a fabricating method thereof.

The present invention also provides a transflective liquid crystal display device having a dual cell gap, a color filter layer including a through hole and a reflective layer including unevenness, and a fabricating method thereof.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages, as embodied and broadly described, a transflective liquid crystal display device includes: first and second substrates facing and spaced apart from each other; a gate line and a data line on an inner surface of the first substrate, the gate line and the data line crossing each other to define a pixel region having reflective and transmissive portions; a thin film transistor connected to the gate line and the data line; a first passivation layer on the thin film transistor, the first passivation layer having a protrusion in the reflective portion; a reflective layer on the first passivation layer and having unevenness; a second passivation layer on the reflective layer; a pixel electrode on the second passivation layer; a color filter layer on an inner surface of the second substrate, the color filter layer having at least one through hole in the reflective portion; an overcoat layer on the color filter layer, the overcoat layer having an open portion in the transmissive portion; a common electrode on the overcoat layer; and a liquid crystal layer between the pixel electrode and the common electrode.

In another aspect, a transflective liquid crystal display device includes: first and second substrates facing and spaced apart from each other; a gate line and a data line on an inner surface of the first substrate, the gate line and the data line crossing each other to define a pixel region having reflective and transmissive portions; a thin film transistor connected to the gate line and the data line; a first passivation layer on the thin film transistor, the first passivation layer having a protrusion in the reflective portion; a pixel electrode on the first passivation layer; a reflective layer on the pixel electrode and having unevenness; a color filter layer on an inner surface of the second substrate, the color filter layer having at least one through hole in the reflective portion; an overcoat layer on the color filter layer, the overcoat layer having an open portion in the transmissive portion; a common electrode on the overcoat layer; and a liquid crystal layer between the pixel electrode and the common electrode.

In another aspect, a fabricating method of an array substrate for a transflective liquid crystal display device includes: forming a gate line and a data line on a substrate, the gate line and the data line crossing each other to define a pixel region having reflective and transmissive portions; forming a thin film transistor connected to the gate line and the data line; forming a first passivation layer on the thin film transistor, the first passivation layer having a protrusion in the reflective portion; forming a reflective layer on the first passivation layer and having unevenness; forming a second passivation layer on the reflective layer; and forming a pixel electrode on the second passivation layer.

In another aspect, a fabricating method of an array substrate for a transflective liquid crystal display device includes: forming a gate line and a data line on a substrate, the gate line and the data line crossing each other to define a pixel region having reflective and transmissive portions; forming a thin film transistor connected to the gate line and the data line; forming a first passivation layer on the thin film transistor, the first passivation layer having a protrusion in the reflective portion; forming a pixel electrode on the first passivation layer; and forming a reflective layer on the pixel electrode and having unevenness.

In another aspect, a fabricating method of a color filter substrate for a transflective liquid crystal display device includes: forming a color filter layer on a substrate having reflective and transmissive portions, the color filter layer having at least one through hole in the reflective portion; forming an overcoat layer on the color filter layer, the color filter layer having an open portion in the transmissive portion; and forming a common electrode on the overcoat layer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, an example of which is illustrated in the accompanying drawings.

Figure 4:
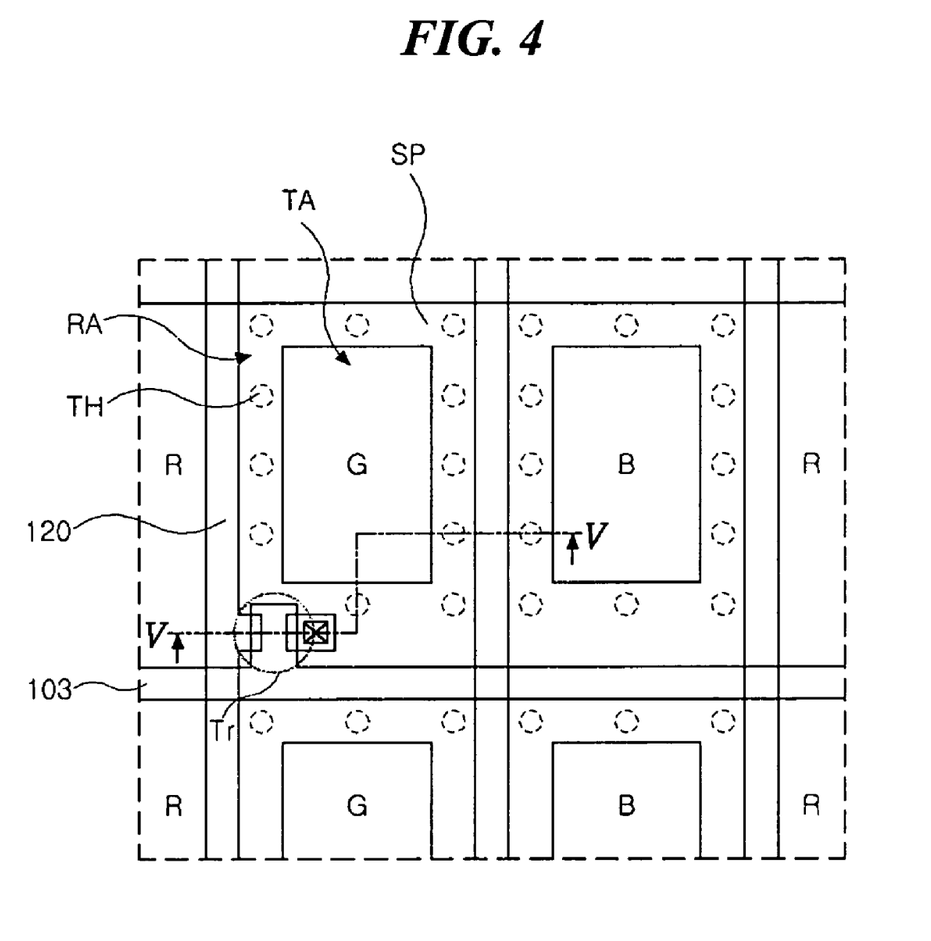
FIG. 4 is a schematic plane view of a transflective liquid crystal display device according to a first embodiment of the present invention.

FIG. 4 is a schematic plane view of a transflective liquid crystal display device according to a first embodiment of the present invention.

In FIG. 4, a gate line 103 and a data line 120 cross each other to define a pixel region "SP" and a thin film transistor (TFT) "Tr" is connected to the gate line 103 and the data line 120. A color filter layer of a color resin includes red, green and blue sub-color filters sequentially disposed in the pixel region "SP." The pixel region "SP" includes a transmissive portion "TA" and a reflective portion "RA." The color filter layer has a through hole "TH" in the reflective portion "RA." The through hole "TH" may be formed by removing the color resin.

Figure 5:
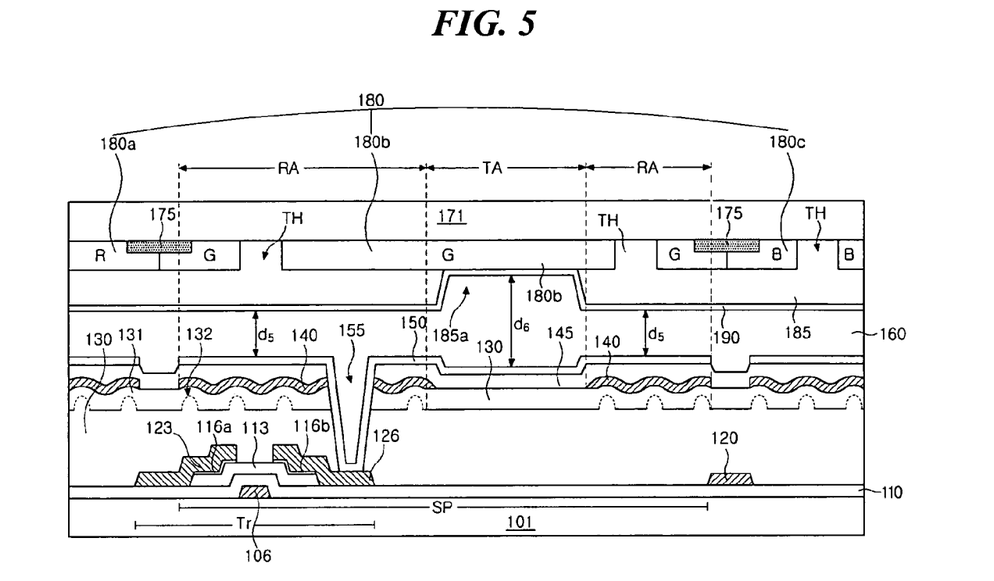
FIG. 5 is a schematic cross-sectional view taken along a line "V-V" of FIG. 4.

FIG. 5 is a schematic cross-sectional view taken along a line "V-V" of FIG. 4.

In FIG. 5, a gate electrode 106 and a gate line (not shown) are formed on a first substrate 101. A gate insulating layer 110 of an inorganic material such as silicon oxide ($SiO_2$) and silicon nitride (SiNx) is formed on the gate electrode 106 and the gate line (not shown). An active layer 113 of amorphous silicon and an ohmic contact layer 116a and 116b of impurity-doped amorphous silicon are sequentially formed on the gate insulating layer 110 over the gate electrode 106. Source and drain electrodes 123 and 126 are formed on the ohmic contact layer 116a and 116b. The gate electrode 106, the active layer 113, the ohmic contact layer 116a and 116b, the source electrode 123 and the drain electrode 126 constitute a thin film transistor (TFT) "Tr" of a switching element. A data line 120 of the same material as the source and drain electrodes 123 and 126 is formed on the gate insulating layer 110. Even though not shown in FIG. 5, the data line 120 is connected to the source electrode 123 and the data line 120 crosses the gate line to define a pixel region "SP" including a transmissive portion "TA" and a reflective portion "RA."

First and second passivation layers 130 and 131 of an organic material such as benzocyclobutene (BCB) and acrylic resin are sequentially formed on the data line 120 and the source and drain electrodes 123 and 126. The first passivation layer 130 has one or more protrusions 132 in the reflective portion "RA" to obtain unevenness of a reflective layer 140. The second passivation layer 131 has an uneven surface in the reflective portion "RA" due to the protrusion 132 of the first passivation layer 130. A reflective layer 140 of a metallic material is formed on the second passivation layer 131 in the reflective portion "RA." The reflective layer 140 has unevenness on its surface due to the uneven surface of the second passivation layer 131. A third passivation layer 145 of an inorganic material such as silicon oxide ($SiO_2$) and silicon nitride (SiNx) is formed on the reflective layer 140. The third passivation layer 145 has a drain contact hole 155 exposing the drain electrode 126 through the reflective layer 140, the second passivation layer 131 and the first passivation layer 130. A pixel electrode 150 of a transparent conductive material such as indium-tin-oxide (ITO) and indium-zinc-oxide (IZO) is formed on the third passivation layer 145 in the pixel region "SP." The pixel electrode 150 is connected to the drain electrode 126 through the drain contact hole 155.

A black matrix 175 of one of a metallic material and a resin is formed on a second substrate 171. The black matrix 175 corresponds to the gate line (not shown) and the data line 120. A color filter layer 180 including red, green and blue sub-color filters 180a, 180b and 180c is formed on the black matrix 175. Each of red, green and blue sub-color filters 180a, 180b and 180c corresponds to the pixel region "SP." The color filter layer 180 has a through hole "TH" in the reflective portion "RA." The color filter layer 180 may be formed of color resin and the through hole "TH" may be formed by removing the color resin. An overcoat layer 185 of a transparent material is formed on the color filter layer 180. The overcoat layer 185 has an open portion 185a in the transmissive portion "TR." In other words, the overcoat layer 185 is present in the reflective portion but essentially not in the transmissive portion. In addition, the overcoat layer 185 fills the through hole "TH." A common electrode 190 is formed on the overcoat layer 185.

A liquid crystal layer 160 is formed between the pixel electrode 150 and the common electrode 190. A first cell gap (i.e., a thickness of the liquid crystal layer 160) "$d_5$" in the reflective portion "RA" may be formed to be substantially a half of a second cell gap "$d_6$" in the transmissive portion "TA" by adjusting a height of the overcoat layer 185 in the reflective portion "RA." Accordingly, a cell efficiency of the reflective portion "RA" and the transmissive portion "TA" is maximized. Moreover, since a color filter layer 180 has a through hole "TH" in the reflective portion "RA," a uniform color property and brightness of the reflective portion "RA" and the transmissive portion "TA" may be obtained. In addition, since the reflective layer 140 includes unevenness, reflection efficiency may be improved.

In the LCD device according to the second embodiment of the present invention, a dual cell gap for the maximum cell efficiency may be obtained by adjusting the height of an overcoat layer 185 on a second substrate 171. Therefore, problems occurring when a protrusion for unevenness and an open portion for a dual cell gap are simultaneously formed on a first substrate through one etching process are solved.

Figure 6:
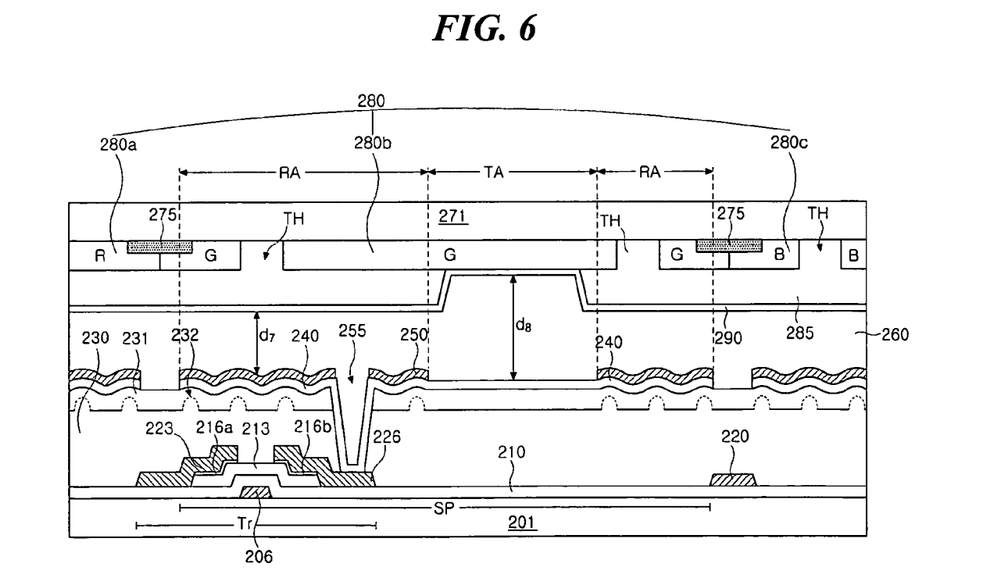
FIG. 6 is a schematic cross-sectional view of a transflective liquid crystal display device according to a second embodiment of the present invention.

FIG. 6 is a schematic cross-sectional view of a transflective liquid crystal display device according to a second embodiment of the present invention.

In FIG. 6, a gate electrode 206 and a gate line (not shown) are formed on a first substrate 201. A gate insulating layer 210 of an inorganic material such as silicon oxide ($SiO_2$) and silicon nitride (SiNx) is formed on the gate electrode 206 and the gate line (not shown). An active layer 213 of amorphous silicon and an ohmic contact layer 116a and 116b of impurity-doped amorphous silicon are sequentially formed on the gate insulating layer 210 over the gate electrode 206. Source and drain electrodes 223 and 226 are formed on the ohmic contact layer 216a and 216b. The gate electrode 206, the active layer 213, the ohmic contact layer 216a and 216b, the source electrode 223 and the drain electrode 226 constitute a thin film transistor (TFT) "Tr" as a switching element. A data line 220 of the same material as the source and drain electrodes 223 and 225 is formed on the gate insulating layer 210. Even though not shown in FIG. 6, the data line 220 is connected to the source electrode 223 and the data line 220 crosses the gate line (not shown) to define a pixel region "SP" including a transmissive portion "TA" and a reflective portion "RA."

First and second passivation layers 230 and 231 of an organic material such as benzocyclobutene (BCB) and acrylic resin are sequentially formed on the data line 220 and the source and drain electrodes 223 and 226. The first passivation layer 230 has a protrusion 232 in the reflective portion "RA" to obtain unevenness of a reflective layer 240. The second passivation layer 231 has an uneven surface in the reflective portion "RA" due to the protrusion 232 of the first passivation layer 230. The first and second passivation layers 230 and 231 have a drain contact hole 255 exposing the drain electrode 226.

A pixel electrode 250 of a transparent conductive material such as indium-tin-oxide (ITO) and indium-zinc-oxide (IZO) is formed on the second passivation layer 231 in the pixel region "SP." The pixel electrode 250 is connected to the drain electrode 226 through the drain contact hole 255. The pixel electrode 250 has an uneven surface in the reflective portion "RA" due to the protrusion of the first passivation layer 230. A reflective layer 240 of a metallic material such as aluminum (Al) and aluminum (Al) alloy is formed on the pixel electrode 250 in the reflective portion "RA." Since the reflective layer 240 directly contacts the pixel electrode 250, the reflective layer 240 has unevenness on its surface due to the uneven surface of the pixel electrode 250.

A liquid crystal layer 260 is formed between the reflective electrode 240 and a common electrode 290. A first cell gap (i.e., a thickness of the liquid crystal layer 260) "$d_7$" in the reflective portion "RA" may be formed to be substantially a half of a second cell gap "$d_8$" in the transmissive portion "TA" by adjusting a height of an overcoat layer 285 in the reflective portion "RA." Accordingly, a cell efficiency of the reflective portion "RA" and the transmissive portion "TA" is maximized. Moreover, since a color filter layer 280 has a through hole "TH" in the reflective portion "RA," a uniform color property and brightness of the reflective portion "RA" and the transmissive portion "TA" may be obtained. In addition, since the reflective layer 240 includes unevenness, reflection efficiency may be improved.

As in the first embodiment, a black matrix 275 of a metallic material or resin is formed on the second substrate 271. The black matrix 275 corresponds to the gate line (not shown) and the data line 220. The color filter layer 280 that includes red, green and blue sub-color filters 280a, 280b and 280c is formed on the black matrix 275. Each of red, green and blue sub-color filters 280a, 280b and 280c corresponds to the pixel region "SP." The overcoat layer 285 is formed of a transparent material on the color filter layer 280, has an open portion 285a in the transmissive portion "TR," and fills the through hole "TH." A common electrode 290 is formed on the overcoat layer 285.

In the LCD device according to the second embodiment of the present invention, a dual cell gap for the maximum cell efficiency may be obtained by adjusting the height of an overcoat layer 285 on a second substrate 271. Therefore, problems occurring when a protrusion for unevenness and an open portion for a dual cell gap are simultaneously formed on a first substrate through one etching process are solved.

FIGS. 7A to 7G are schematic cross-sectional views showing a fabricating process of an array substrate for a liquid crystal display device according to a first embodiment of the present invention.

Figure 7A:
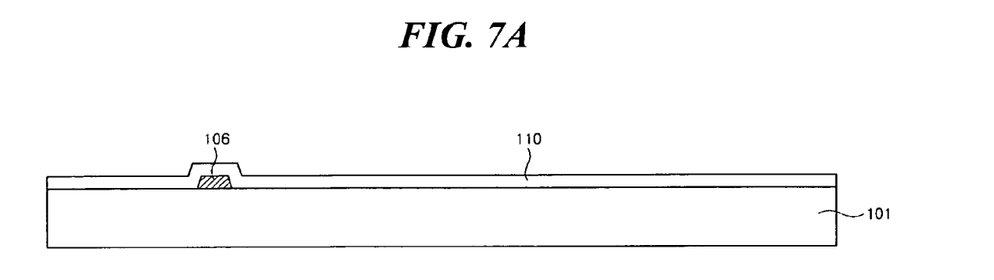
FIGS. 7A to 7G are schematic cross-sectional views showing a fabricating process of an array substrate for a liquid crystal display device according to a first embodiment of the present invention.

In FIG. 7A, a gate electrode 106 and a gate line (not shown) are formed on a substrate 101 by depositing and patterning a metallic material such as chromium (Cr), aluminum (Al) and copper (Cu). The deposited metallic material may be patterned through a photolithographic process using a photoresist (PR). The gate electrode 106 and the gate line (not shown) may have a double layer of aluminum/molybdenum (Al/Mo). A gate insulating layer 110 is formed on the gate electrode 106 and the gate line (not shown) by depositing an inorganic material such as silicon oxide ($SiO_2$) and silicon nitride (SiNx).

Figure 7B:
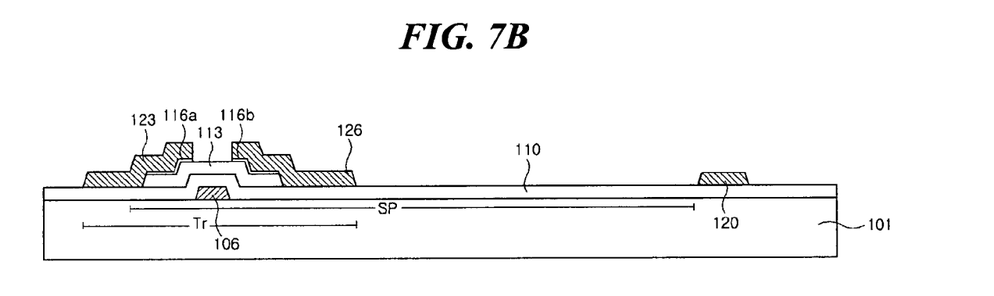

In FIG. 7B, an active layer 113 and an ohmic contact layer 116a and 116b are sequentially formed on the gate insulating layer 110 over the gate electrode 106 by depositing and patterning amorphous silicon and impurity-doped amorphous silicon. Source and drain electrodes 123 and 126 are formed on the ohmic contact layer 116a and 116b by depositing a metallic material such as chromium (Cr), molybdenum (Mo) and aluminum (Al). The source and drain electrodes 123 and 126 are spaced apart from the gate electrode 106 disposed therebetween. At the same time, a data line 120 crossing the gate line (not shown) to define a pixel region "SP" is formed on the gate insulating layer 110. The data line 120, the source electrode 123 and the drain electrode 126 may be formed of a double layer such as aluminum/chromium (Al/Cr) and aluminum/molybdenum (Al/Mo). A portion (not shown) of the ohmic contact layer exposed between the source and drain electrodes 123 and 126 is removed by using the source and drain electrodes 123 and 126 as an etching mask and the active layer 113 is exposed between the source and drain electrodes 123 and 126. The gate electrode 106, the active layer 113, the ohmic contact layer 116a and 116b, the source electrode 123 and the drain electrode 126 constitute a thin film transistor (TFT) "Tr" as a switching element. Even though not shown in FIG. 7B, the data line 120 is connected to the source electrode 123.

Figure 7C:
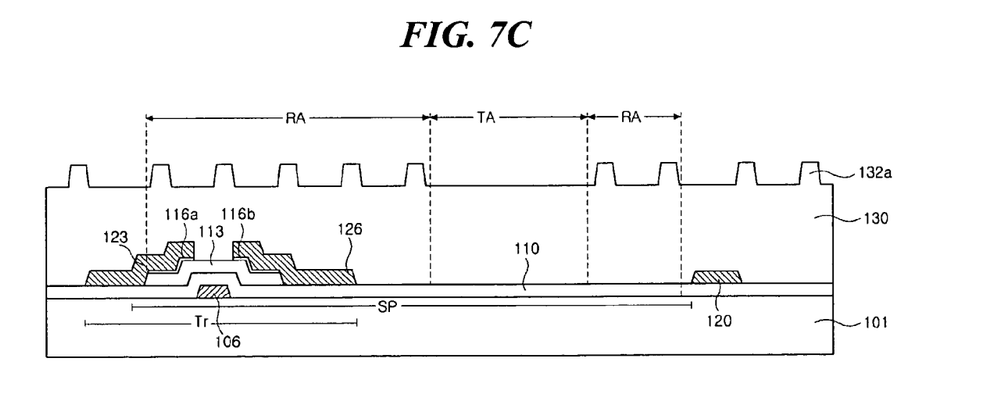

In FIG. 7C, a first passivation layer 130 is formed on the data line 120 and the source and drain electrodes 123 and 126 by coating an organic material such as benzocyclobutene (BCB) and acrylic resin. The first passivation layer 130 has a first protrusion 132a in a reflective portion "RA" of the pixel region "SP." For example, when BCB is used for the first passivation layer 130, a photoresist (PR) pattern (not shown) may be formed on the first passivation layer 130 and the first passivation layer 130 may be patterned using the PR pattern as a mask to obtain the first protrusion 132a. When photoacryl is used as acrylic resin for the first passivation layer 130, the first protrusion 132a may be obtained by exposure and development of the photo-acryl without using PR. Negative type photo-acryl or positive type photo-acryl may be used for the first passivation layer 130. For illustration, photo-acryl is used for the first passivation layer 130 in FIG. 7C. The first protrusion 132a may have a trapezoid shape and a slant angle of the first protrusion 132a may be adjusted using a space between patterns of a photo mask for the first protrusion 132a.

Figure 7D:
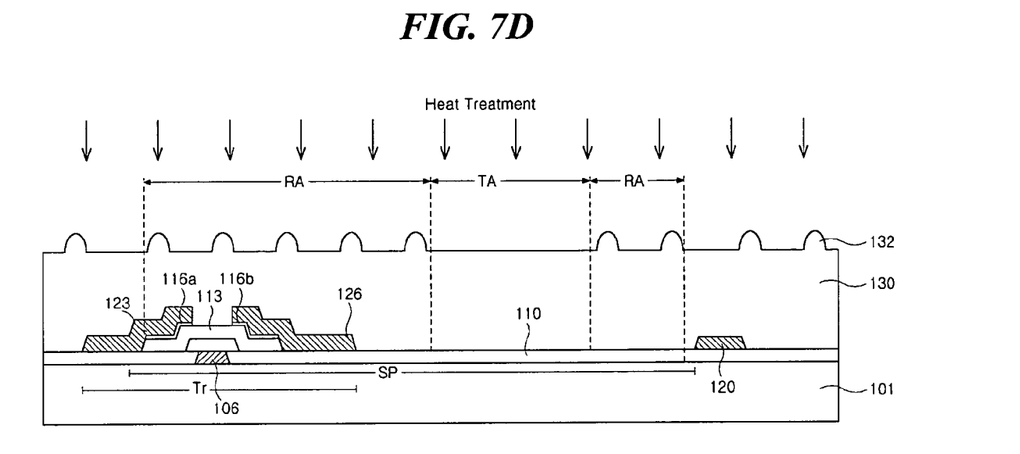

In FIG. 7D, the first protrusion 132a may become a second protrusion 132 of a round shape through heat treatment. The first protrusion 132a may be melted and flow. Then, the melted first protrusion 132a is solidified to be the second protrusion 132.

Figure 7E:
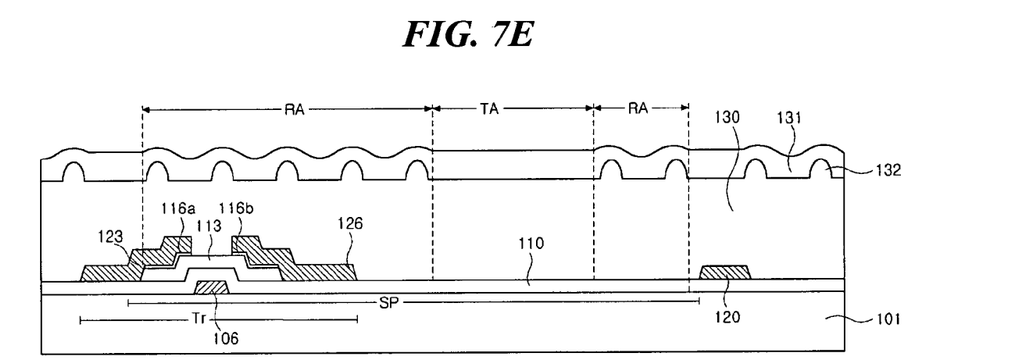

In FIG. 7E, a second passivation layer 131 is formed on the first passivation layer 132 by depositing and baking an organic material such as benzocyclobutene (BCB) and acrylic resin. The second passivation layer 131 has an uneven surface in the reflective portion "RA" due to the second protrusion 132 of the first passivation layer 130.

Figure 7F:
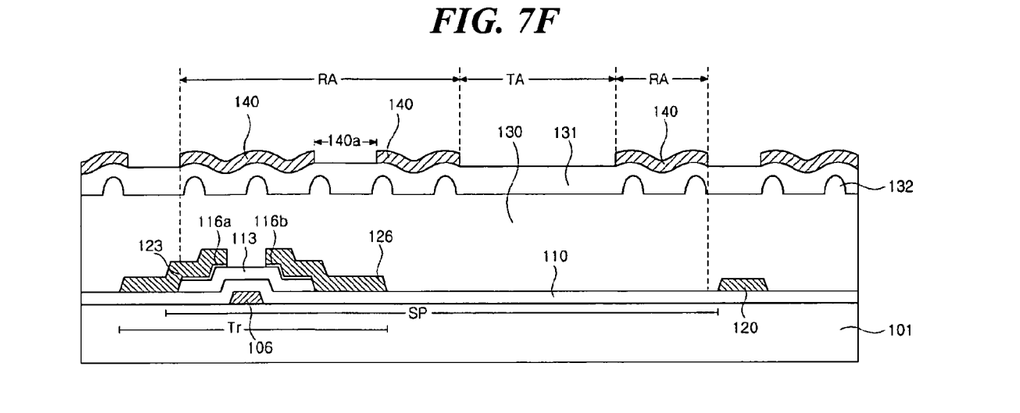

In FIG. 7F, a reflective layer 140 is formed on the second passivation layer 131 in the reflective portion "RA" by depositing and patterning a metallic material having a high reflectance such as aluminum (Al) and aluminum (Al) alloy. The reflective layer 140 has unevenness due to the uneven surface of the second passivation layer 131. The reflective layer 140 is not formed on or removed from areas that correspond to a transmissive portion "TA" and a drain contact hole portion 140a for exposing the drain electrode 126. When the metallic material is deposited directly on the second passivation layer 131 of an organic material through sputtering method, the metallic material may contaminate interior of a chamber. Since the contamination of the chamber can cause inferiority in a subsequent process, an additional insulating layer (not shown) of an inorganic material may be formed on the second passivation layer 131 before forming the reflective layer 140.

Figure 7G:
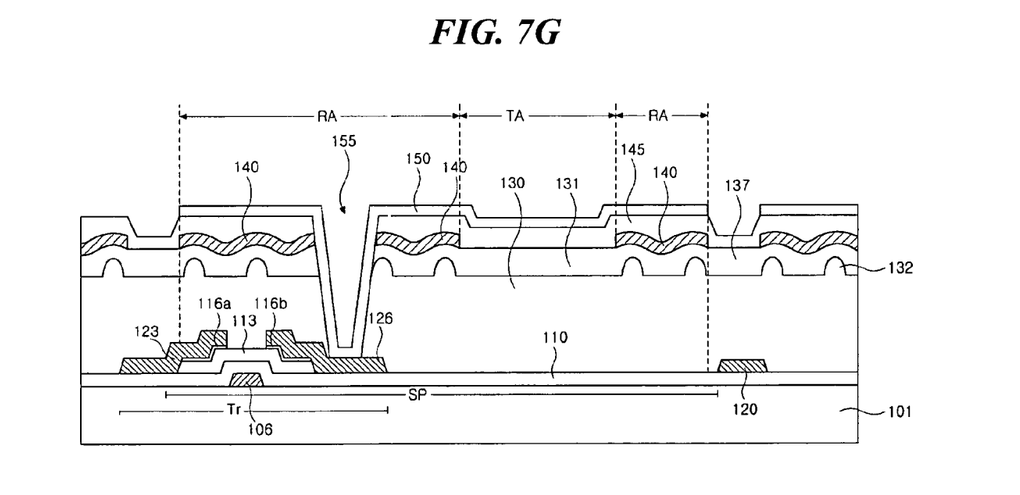

In FIG. 7G, a third passivation layer 145 is formed on the reflective layer 140 by depositing one of an inorganic material such as silicon oxide (SiO$_2$) and silicon nitride (SiNx) or coating an organic material such as benzocyclobutene (BCB) and acrylic resin. Then, a drain contact hole 155 exposing the drain electrode 126 is formed by etching third passivation layer 145, the second passivation layer 131 and the first passivation layer 130. A pixel electrode 150 is formed on the third passivation layer 145 in the pixel region "SP" by depositing and patterning a transparent conductive material such as indium-tin-oxide (ITO) and indium-zinc-oxide (IZO). The pixel electrode 150 is connected to the drain electrode 126 through the drain contact hole 155.

FIGS. 8A to 8E are schematic cross-sectional view showing a fabricating process of an array substrate for a liquid crystal display device according to a second embodiment of the present invention.

Figure 8A:
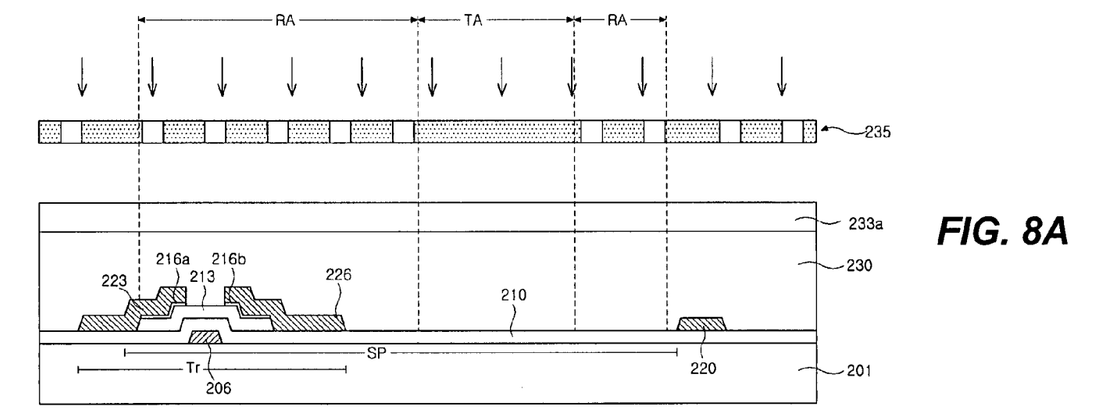
FIGS. 8A to 8E are schematic cross-sectional view showing a fabricating process of an array substrate for a liquid crystal display device according to a second embodiment of the present invention.

In FIG. 8A, a gate electrode 206 and a gate line (not shown) are formed on a substrate 201. A gate insulating layer 210 is formed on the gate electrode 206 and the gate line (not shown) by depositing an inorganic material such as silicon oxide (SiO$_2$) and silicon nitride (SiNx). An active layer 213 and an ohmic contact layer 216a and 216b are sequentially formed on the gate insulating layer 210 over the gate electrode 206 by depositing amorphous silicon and impurity-doped amorphous silicon and patterning amorphous silicon and impurity-doped amorphous silicon. Source and drain electrodes 223 and 226 are formed on the ohmic contact layer 216a and 216b. At the same time, a data line 220 is formed on the gate insulating layer 210. The gate electrode 206, the active layer 213, the ohmic contact layer 216a and 216b, the source electrode 223 and the drain electrode 226 constitute a thin film transistor (TFT) "Tr" as a switching element. Even though not shown in FIG. 8A, the data line 220 is connected to the source electrode 223 and the data line 220 crosses the gate line (not shown) to define a pixel region "SP."

First passivation layer 230 is formed on the data line 220 and the source and drain electrodes 223 and 226 by coating an organic material such as benzocyclobutene (BCB) and acrylic resin. In a second embodiment, for example, BCB is used for the first passivation layer 230. After coating BCB, a photoresist PR layer 233a is coated on the first passivation layer 230. A mask 235 having a transmissive region and a shielding region is disposed over the PR layer 233a and light is irradiated onto the PR layer 233a through the mask 235.

Figure 8B:
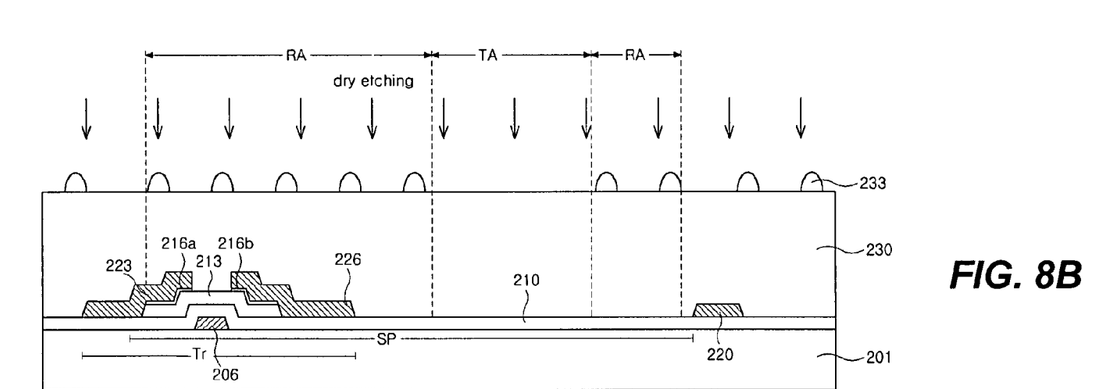

In FIG. 8B, a PR pattern 233 corresponding to the reflective portion "RA" is obtained by developing the irradiated PR layer 233a (of FIG. 8A). The first passivation layer 230 is etched using the PR pattern 233 as an etch mask.

Figure 8C:
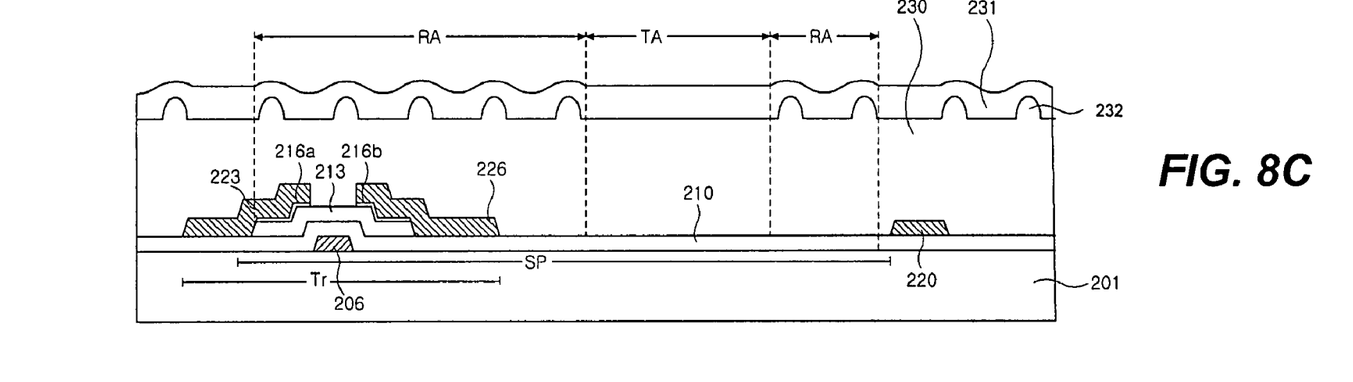

In FIG. 8C, a protrusion 232 corresponding to the PR pattern 233 (of FIG. 8B) is obtained by etching the first passivation layer 230. A second passivation layer 231 is formed on the first passivation layer 230 by coating an organic material such as benzocyclobutene (BCB) and acrylic resin. The second passivation layer 231 has an uneven surface in the reflective portion "RA" due to the protrusion 232 of the first passivation layer 230.

Figure 8D:
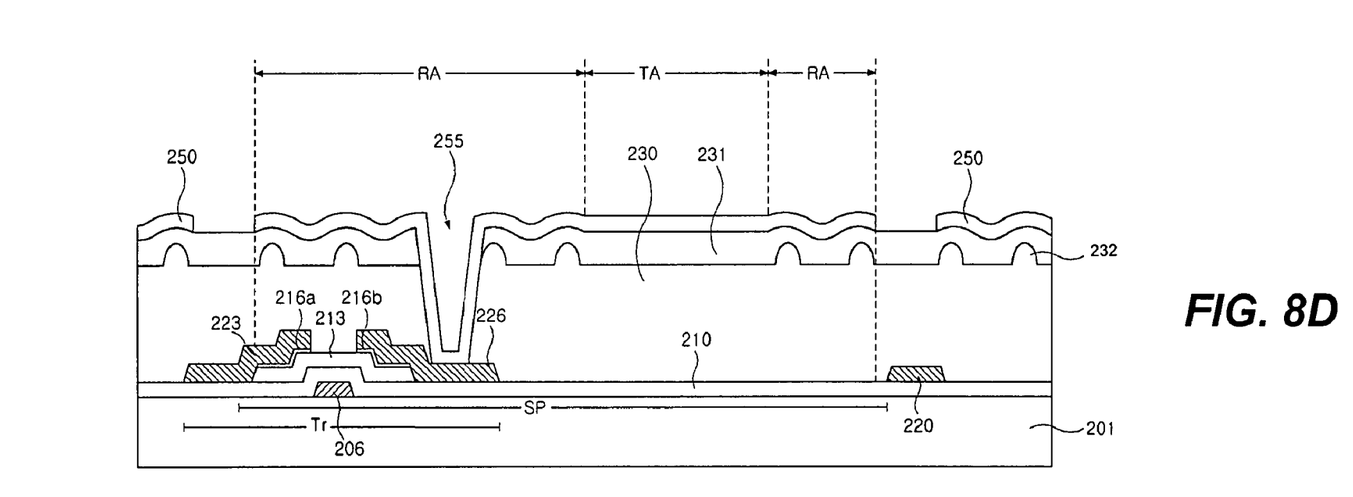

In FIG. 8D, a drain contact hole 255 exposing the drain electrode 226 is formed by etching the first and second passivation layers 230 and 231. A pixel electrode 250 connected to the drain electrode 226 through the drain contact hole 255 is formed on the second passivation layer 231 by depositing and patterning a transparent conductive material such as indium-tin-oxide (ITO) and indium-zinc-oxide (IZO). The pixel electrode 250 has an uneven surface in the reflective portion "RA" due to the protrusion 232 of the first passivation layer 230.

Figure 8E:
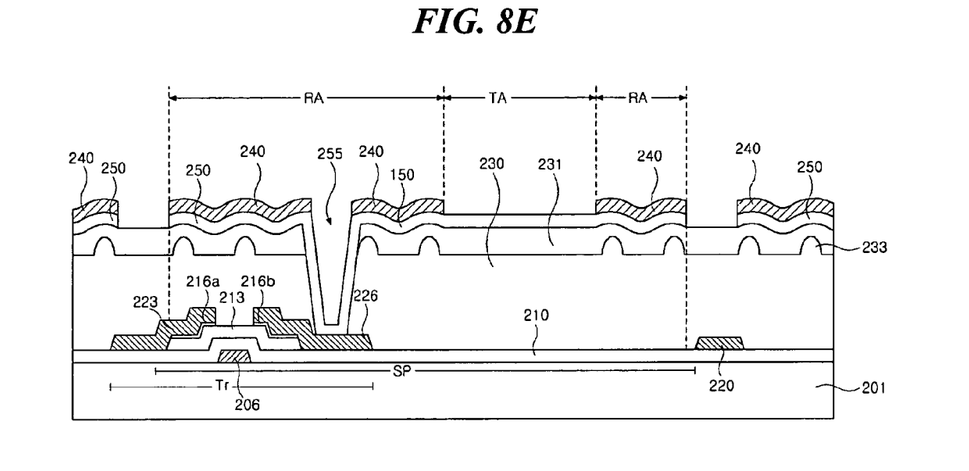

In FIG. 8E, a reflective layer 240 is formed on the pixel electrode 250 in the reflective portion "RA" by depositing and patterning a metallic material having high reflectance. Since the reflective layer 240 directly contacts the pixel electrode 250, the reflective layer 240 has unevenness on its surface due to the uneven surface of the pixel electrode 250 and the reflective layer 240 functions as an electrode.

FIGS. 9A to 9D are schematic cross-sectional views showing a fabricating process of a color filter substrate for a liquid crystal display device according to a first embodiment of the present invention.

Figure 9A:
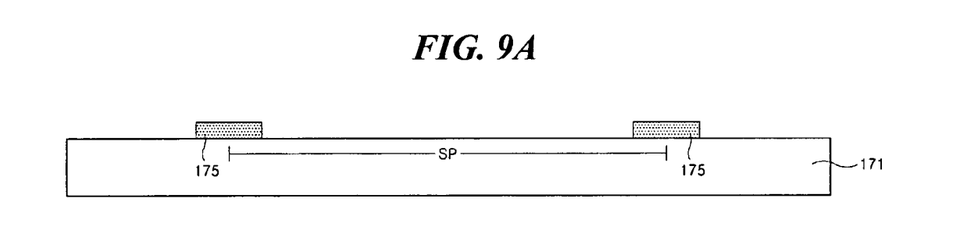
FIGS. 9A to 9D are schematic cross-sectional views showing a fabricating process of a color filter substrate for a liquid crystal display device according to a first embodiment of the present invention.

In FIG. 9A, a black matrix 175 is formed on a substrate 171 by depositing and patterning a metallic material or coating and patterning a resin. The black matrix 175 may be omitted in an LCD device of high resolution and high aperture ratio.

Figure 9B:
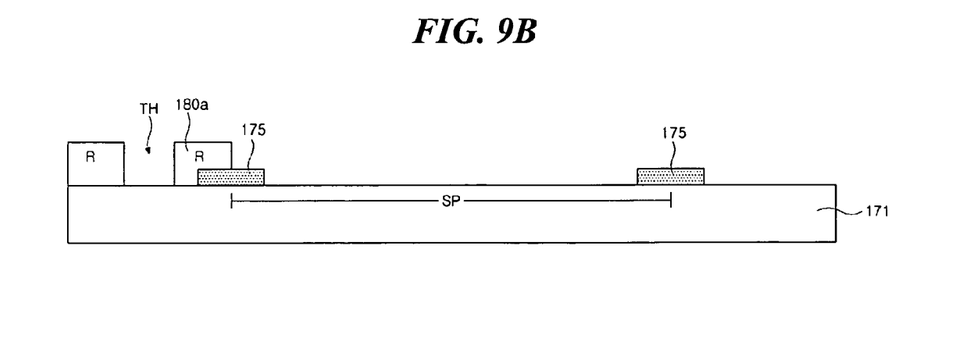

In FIG. 9B, a red sub-color filter 180a having a through hole "TH" in the reflective portion "RA" is formed on the black matrix 175 by coating and patterning red color resin. The number and size of the through hole "TH" may be determined according to color property of the reflective portion "RA" and the transmissive portion "TA."

Figure 9C:
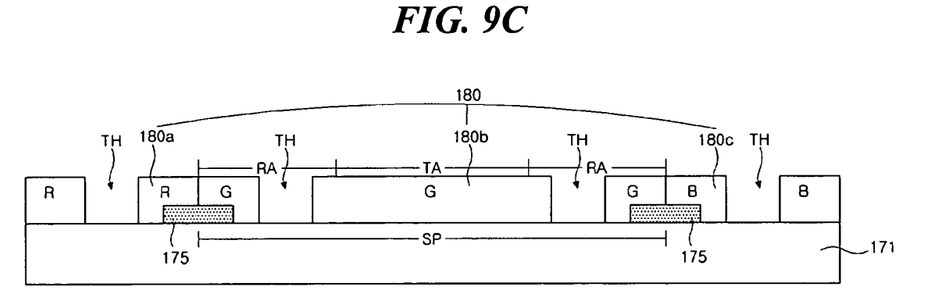

In FIG. 9C, green and blue sub-color filters 180b and 180c having a through hole "TH" in the reflective portion "RA" are sequentially formed on the black matrix 175 through a process similar to that for the red sub-color filter 180a. Even though not shown in FIG. 9C, the red, green and blue sub-color filters 180a, 180b and 180c corresponding a pixel region "SP" alternate with each other through the substrate 171 and constitute a color filter layer 180.

Figure 9D:
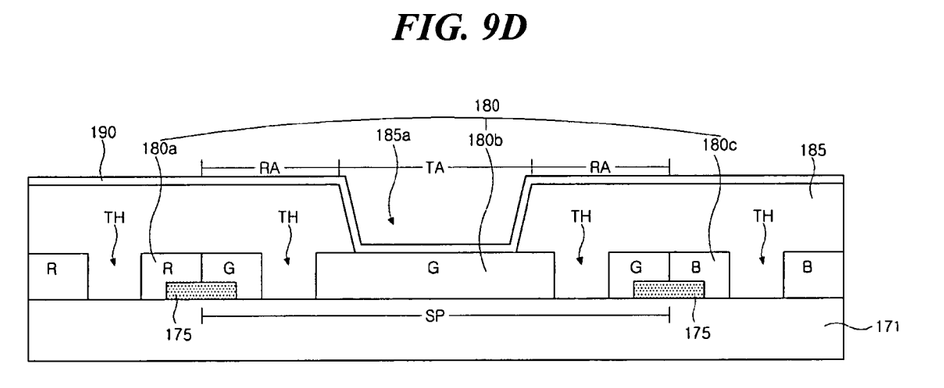

In FIG. 9D, an overcoat layer 185 is formed on the color filter layer 180 by coating and patterning a transparent material. The overcoat layer 185 has an open portion 185a in the transmissive portion "TR" and exposing the color filter layer 180. The overcoat layer 185 may be formed to have a thickness in the reflective portion "RA" substantially a half of a cell gap (not shown) of an LCD in the transmissive portion "TA." In addition, the overcoat layer 185 fills the through hole "TH." A common electrode 190 is formed on the overcoat layer 185 by depositing one of indium-tin-oxide (ITO) and indium-zinc-oxide (IZO).

The array substrate fabricated through a process of FIGS. 7A to 7F or FIGS. 8A to 8E and the color filter substrate fabricated through a process of FIGS. 9A to 9C may be attached through a cell process including an orientation step, a gap step and an inspection step, and a liquid crystal layer may be formed between the pixel electrode and the common electrode.

Consequently, a liquid crystal display device according to the present invention has some advantages. Since a reflective layer includes unevenness, reflection efficiency may be improved. A passivation layer having a protrusion for the unevenness of the reflective layer is formed without step generation between reflective and transmissive portions. Accordingly, process problems occurring when the protrusion and the step are simultaneously formed through one etching process are solved and inferiority in fabrication is reduced. Even though the step between the reflective and transmissive portions is not formed in the passivation layer on an array substrate, the step is formed in an overcoat layer on a color filter substrate. Accordingly, a dual cell gap is obtained and a cell efficiency of the reflective and transmissive portions is maximized. Moreover, since a color filter layer has a plurality of through holes in the reflective portion, uniform color property and high brightness of the reflective and transmissive portions are obtained by adjusting total number and unit size of the through holes.

What is claimed is:

1. A fabricating method of a transflective liquid crystal display device, comprising:
    forming a gate line and a data line on a first substrate, the gate line and the data line crossing each other to define a pixel region having reflective and transmissive portions;
    forming a thin film transistor connected to the gate line and the data line;
    forming a first passivation layer on the thin film transistor, the first passivation layer having a plurality of protrusions in the reflective portion, wherein the plurality of protrusions are formed by patterning the first passivation layer, and wherein a top surface of the first passivation layer between the plurality of protrusions is substantially even;
    forming an uneven reflective layer on the first passivation layer in the reflective portion that has unevenness at least in part due to the plurality of protrusions;
    forming a pixel electrode on the first passivation layer;
    providing a second substrate having a color filter layer, each color filter of the color filter layer having regions corresponding in dimension and arrangement to the reflective and transmissive portions of a pixel region and having at least one through hole in the reflective portion, the second substrate further comprising: an overcoat layer on the color filter layer, a surface of the overcoat layer having a recess portion in the transmissive region;
    a common electrode on the surface of the overcoat layer; and
    disposing the first substrate such that reflective and transmissive portions of the first substrate oppose the corresponding regions of the second substrate.

2. The method according to claim 1, further comprising forming a second passivation layer on the reflective layer and the pixel electrode on the second passivation layer.

3. The method according to claim 1, further comprising forming the reflective layer on the pixel electrode.

4. The method according to claim 1, wherein the reflective layer includes one of aluminum and aluminum alloy.

5. The method according to claim 1, further comprising forming an insulating layer of an inorganic material between the first passivation layer and the reflective layer.

6. The method according to claim 1, wherein the first passivation layer includes one of benzocyclobutene and acrylic resin.

7. The method according to claim 2, wherein the second passivation layer includes one of silicon oxide and silicon nitride.

8. The method according to claim 2, wherein the second passivation layer includes one of benzocyclobutene and acrylic resin.

9. The method according to claim 2, further comprising forming a contact hole through the first and second passivation layers and connecting the pixel electrode to the thin film transistor through the contact hole.

10. The method according to claim 1, further comprising substantially maintaining a thickness of the first passivation layer between the transmissive portion and a section of the reflective portion in which the transistor is absent.

11. The method according to claim 1, further comprising forming the first passivation layer in the transmissive portion.

12. The method according to claim 11, further comprising forming the first passivation layer in the transmissive portion such that no protrusions are formed in the transmissive portion.

13. The method according to claim 1, wherein the depth of the recess is dimensioned such that the distance between the common electrode in the transmissive portion and the first passivation layer is approximately twice the distance between the common electrode in the reflective portion and the first passivation layer.

14. The method according to claim 1, further comprising providing a liquid crystal layer in the transmissive and reflective portions and increasing a thickness of the liquid crystal layer in the transmissive portion compared with the thickness of the liquid crystal layer in the reflective portion without decreasing a thickness of any other layer on the substrate besides the reflective layer.

\* \* \* \* \*